Jan. 4, 1949.  L. B. MacGREGOR  2,458,396

TRANSMISSION GEARING

Filed May 25, 1944

INVENTOR;
LAURENCE B. MACGREGOR

BY Bruninga & Sutherland
ATTORNEYS

Patented Jan. 4, 1949

2,458,396

UNITED STATES PATENT OFFICE 2,458,396

TRANSMISSION GEARING

Laurence B. MacGregor, Long Beach, Calif., assignor to L. & M. Rubber Products, Inc., a corporation of California Application May 25, 1944, Serial No. 537,233

4 Claims. (Cl. 74—230.7)

This invention relates to improvements in transmission gearing and particularly to the type comprising a pulley having one or more parallel circumferential wedge-shaped grooves to receive one or more wedge-shaped belts.

This application is a continuation in part of application Serial Number 506,114, filed October 13, 1943, Patent No. 2,355,666 issued August 15, 1944, copending with application, Serial No. 403,977, filed July 25, 1941, forfeited October 15, 1943, as to subject matter common to the applications.

In transmission gearing of the type referred to, in which a pulley is provided with one or more wedge-shaped belt grooves and in which one or more wedge shaped belts are designed to engage these grooves, the belt is usually formed of rubber impregnated fabric webbing in built-up layers.

Experience has shown that where such belt passing over pulleys is utilized for driving different shaft members from a line shaft, any variation in the torque of the line shaft causes the belt to whip. This whipping action is liable to gradually break down the impregnated fabric structure, with the result that the fibres of the belt start to separate. This separation is caused when the belt tends to assume a transverse curve due to variation in power load, and such tendency of the belt to transversely curve is liable to break the fibres. Moreover, such a belt is liable to rapid wear under such conditions, which requires frequent replacement of the same; such belting is rather high in cost.

One of the subjects of this invention is to so construct the pulley and the belt, that regardless of variation in applied load any whipping in the belt will not appreciably affect the same to cause the fibres to separate or break, with the result that wear is reduced and the belt is assured of long life.

Further objects will appear from the detail description, taken in connection with the accompanying drawings, in which will be set forth a number of illustrative embodiments of this invention; it to be understood however, that this invention is susceptible of various other embodiments, within the scope of the appended claims.

Figure 1:
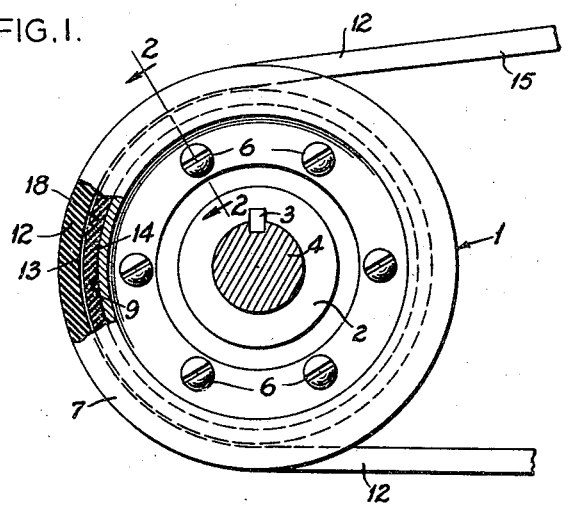
Figure 1 is a fragmentary side elevation, a certain portion being in section, illustrating one embodiment of this invention.

Generally stated, and in accordance with illustrative embodiments of this invention, the transmission gearing comprises a pulley provided with one or more wedge-shaped belt grooves, and one or more wedge-shaped belts are designed to engage these grooves, with the sidewalls of the belt in driving contact with the walls of the groove. This belt is normally wedge-shaped and of sufficient depth to be normally non-flexing transversely and its inner face appreciably spaced from the bottom of the groove. The belt is so designed relative the groove, that under normal conditions, the inner face of the belt is slightly spaced radially from the bottom of the groove so as to be normally out of contact therewith; however, under abnormal conditions of load, this radial space may be taken up so that the inner face of the belt will be in engagement with the bottom of the groove and not only prevent further transverse flexing of the belt, but may also provide additional driving surfaces. The space between the inner face of the belt and the bottom of the groove under normal conditions of drive, depends upon the size of and on the design of the belt and of the groove; in most cases this space allowed can be about one sixteenth of an inch; the expression "slightly spaced" as used in the claims is, therefore, to be construed accordingly. In order to additionally improve the action, the inner face of the belt or the bottom of the groove may have an engaging face which is more resilient than the remainder of the belt. A fillet may be provided in the bottom of the groove and this fillet may be of a material more resilient than the belt. Such a fillet may, however, be applied on the inner face of the belt and again this fillet may be more resilient than the remainder of the belt.

Referring now to the drawings, the improved pulley is designated as an entirety by the numeral 1. It is usual practice to provide a pulley having a hub member 2 adapted to be keyed as at 3 to a shaft 4 for the purpose of driving the hub, and the hub in turn is provided with an annular flange 5 adapted to be detachably secured by screws or the like 6 to an annular rim 7. This rim is formed with an annular flange 8, and the means 6 is passed through aligned openings in the flanges 5 and 8. The rim 7 is formed with one or more, and usually a plurality of circumferential grooves 9. These grooves are usually wedge-shaped, that is to say, provided with side walls 10 and 11 inclined divergently outwardly.

The belt 12 designed to engage the groove 9 corresponds in shape to the groove and as shown there is a space between the inner face 13 of the belt and the bottom 14 of the groove. As the belt rolls along side walls bounding the groove, it gradually moves within the groove to maintain a tight frictional grip on the side walls. The belt is of sufficient depth and stability to be normally non-flexing transversely when its inner face is appreciably spaced from the bottom of the groove. However, due to variations in power load, the top course 15 of the belting, which is usually in tension, relaxes, and upon a reassumption of the power load, a snapping or whipping action in the course 15 occurs. The belting has a tendency to transversely curve, as shown at 16 and 17 in Figure 3. As the belting is relatively stiff as when made up of rubber impregnated layers of fabric and cords, this transverse curving tends to break the rubber impregnations and ofttimes the cords, and cause separation of various layers of the belt. When this occurs, the belt must be replaced, as it is liable to sudden breakage with sometimes disastrous results to both workmen and machinery.

Figure 6:
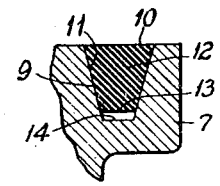

In accordance with the embodiment shown in Figure 6, and which shows the normal operation when the gearing is operating under normal load, the inner face of the belt is slightly spaced radially from the bottom of the groove so as to be out of contact therewith. Under normal conditions of load, however, the belt will flex transversely as noted above, so as to move into the bottom of the groove and engage the same. The inner face of the belt may be more resilient than the remainder thereof, or the bottom of the groove may be constructed to be more resilient than the belt; or both faces may be made resilient. In all cases, however, there is a normal slight radial space between the inner face of the belt and the bottom of the groove under normal conditions of operation, with spacing, as noted previously, has been on the order of one-sixteenth of an inch.

Figure 2:
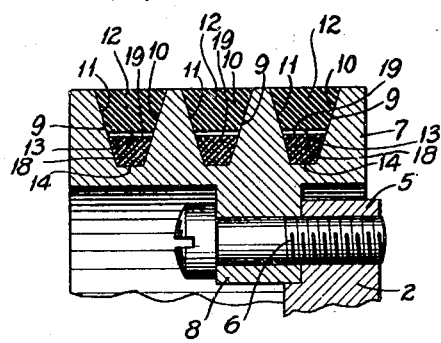
Figure 2 is an enlarged sectional view on the line 2—2 of Figure 1.
Figure 3:
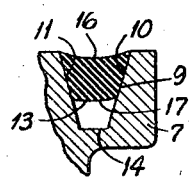
Figure 3 is a sectional view of a prior art construction illustrative of the action that probably occurs when the belting whips in the ordinary form of pulley.

In Figures 1, 2 and 3 an insert of fillet 18 is provided at the bottom of the groove with its outer circumferential face 19 spaced slightly radially from the inner face of the belt. This insert or fillet may be of a material more resilient than the belt and may be formed of rubber or rubber composition. These drawings illustrate the operation previously described in connection with Figure 6. From this it will be seen that the tendency of the belt to curve transversely under abnormal conditions, as shown in Figure 3 is effectively done away with as the belting will contact with the circumferential face 19 and thus transverse bending or curving is prevented. Furthermore, as a belt wears along its side walls, the bottom face of the belt is brought into contact with the circumferential face 19 of the inset or fillet 18 and as this inset or fillet is of softer composition than the belt, or more resilient, wear may occur on said circumferential face so that the fillet is worn as the belting is worn along the sides. Thus, when the belt is worn out and no longer of any use, the fillet has been correspondingly worn.

Figure 5:
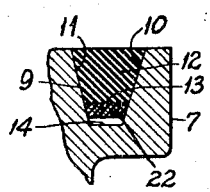

In accordance with another embodiment of this invention as shown in Figure 5, instead of providing the bottom of the groove with a fillet, this fillet 22 may be on the inner face of the belt, and may be made of a material more resilient than the remainder of the belt, as by the employment of rubber or rubber composition. Again there will be a slight radial space between the faces 13 and 14 of the fillet and bottom of the groove.

Figure 4:
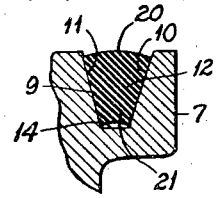
Figures 4, 5, and 6 are cross sections of pulley grooves and of the belts therein, illustrating additional embodiments of this invention.

The belt may have straight outer and inner faces; however, it is of advantage to make the outer face of convex form transversely as shown in Figure 4 and the inner face 21 may also be formed convex. In such a case the edges of the belt may be very near to or even engage the bottom of the groove during normal operation. In such a case the belt may be slightly deformed during abnormal operations as the curved faces tend to straighten out.

It will be seen that the invention accomplishes its objects; for by the described construction of the belt with reference to groove, the belt can accommodate itself to the groove while transverse flexing under abnormal conditions of load is materially restricted. The result is that breaking and wearing of the belt is effectively restricted.

Having thus described the invention, what is claimed is:

1. Transmission gearing, comprising, a pulley provided with a wedge-shaped belt groove and a normally wedge-shaped belt designed to engage said groove, with side walls of said belt in driving contact with the walls of the groove, said belt being of sufficient depth to be normally non-flexing transversely when its inner face is appreciably spaced from the bottom of the groove, the belt being designed relative the groove so that the inner face of the belt is slightly spaced radially from the bottom of the groove so as to be normally out of contact therewith, but so that under abnormal conditions of load said innerface engages the bottom of the groove.

2. Transmission gearing, comprising, a pulley provided with a wedge-shaped belt groove and a normally wedge-shaped belt designed to engage said groove, with side walls of said belt in driving contact with the walls of the groove, said belt being of sufficient depth to be normally non-flexing transversely when its inner face is appreciably spaced from the bottom of the groove, the inner face of the belt being more resilient than the remainder thereof, and the belt being designed relative the groove, so that the inner face of the belt is slightly spaced radially from the bottom of the groove so as to be normally out of contact therewith, but so that under abnormal conditions of load said innerface engages the bottom of the groove.

3. Transmission gearing, comprising, a pulley provided with a wedge-shaped belt groove, a normally wedge-shaped belt designed to engage said groove, with side walls of said belt in driving contact with the walls of the groove, said belt being of sufficient depth to be normally non-flexing transversely when its inner face is appreciably spaced from the bottom of the groove, and a fillet on the inner face of the belt, the belt being designed relative the groove so that the inner face of the fillet is slightly spaced radially from the bottom of the groove so as to be normally out of contact therewith, but so that under abnormal conditions of load said innerface engages the bottom of the groove.

4. Transmission gearing, comprising, a pulley provided with a wedge-shaped belt groove, a normally wedge-shaped belt designed to engage said groove, with side walls of said belt in driving contact with the walls of the groove, said belt being of sufficient depth to be normally non-flexing transversely when its inner face is appreciably spaced from the bottom of the groove, and a fillet on the inner face of the belt and slightly more resilient than the remainder thereof, the belt being designed relative the groove so that the inner face of the fillet is slightly spaced radially from the bottom of the groove so as to be normally out of contact therewith, but so that under abnormal conditions of load said innerface engages the bottom of the groove.

LAURENCE B. MacGREGOR.

REFERENCES CITED

The following references are of record in the file of this patent:

UNITED STATES PATENTS

| Number | Name | Date |
| --- | --- | --- |
| 118,761 | Ward | Sept. 5, 1871 |
| 334,998 | Wardwell | Jan. 26, 1886 |
| 1,792,733 | DeWein | Feb. 17, 1931 |
| 1,818,798 | Freedlander | Aug. 11, 1931 |
| 2,023,421 | Heyer | Dec. 10, 1935 |
| 2,086,804 | Hjartsater | July 13, 1937 |
| 2,355,666 | MacGregor | Aug. 15, 1944 |